(12) United States Patent
Rynbeek

(10) Patent No.: US 10,751,650 B2
(45) Date of Patent: Aug. 25, 2020

(54) BYPASS FILTER METHOD AND DEVICE

(71) Applicant: Winchester Global Pty Ltd, Como (AU)

(72) Inventor: Colin James Rynbeek, Willetton (AU)

(73) Assignee: Winchester Global Pty Ltd, South Perth (AU)

(*) Notice: Subject to any disclaimer, the term of this patent is extended or adjusted under 35 U.S.C. 154(b) by 0 days.

(21) Appl. No.: 15/524,317

(22) PCT Filed: Nov. 4, 2015

(86) PCT No.: PCT/AU2015/000659
§ 371 (c)(1),
(2) Date: May 4, 2017

(87) PCT Pub. No.: WO2016/070222
PCT Pub. Date: May 12, 2016

(65) Prior Publication Data
US 2017/0312663 A1    Nov. 2, 2017

(30) Foreign Application Priority Data
Nov. 4, 2014 (AU) ................. 2014904432

(51) Int. Cl.
*B01D 35/147* (2006.01)
*F02M 37/22* (2019.01)
(Continued)

(52) U.S. Cl.
CPC .......... *B01D 35/147* (2013.01); *B01D 15/00* (2013.01); *B01D 27/07* (2013.01); *B01D 27/103* (2013.01);
(Continued)

(58) Field of Classification Search
CPC ...... B01D 35/147; B01D 29/58; B01D 15/00; B01D 27/07; B01D 27/103; B01D 35/306;
(Continued)

(56) References Cited

U.S. PATENT DOCUMENTS 3,543,935 A * 12/1970 Detrick ................. B01D 29/58
                                                                210/130
3,959,141 A    5/1976 Johnson
(Continued)

FOREIGN PATENT DOCUMENTS

| CN | 102287248 A | 12/2011 |
|----|-------------|---------|
| EP | 0287527 A2 | 10/1988 |
| EP | 1118368 A2 | 7/2001 |

*Primary Examiner* — Madeline Gonzalez
(74) *Attorney, Agent, or Firm* — The Webb Law Firm

(57) ABSTRACT

The present invention relates to a method for converting a full flow oil and/or fuel filter system into a bypass filter system comprising the use of a retro-fittable bypass filter configured to directly replace the pre-existing full flow filter, without the need for additional hoses or mounts etc. as in existing methods. Also described is a filter device for converting a full flow oil and/or fuel filter system into a bypass filter system comprising: an inlet for allowing fluid into the filter; a plurality of screens for filtering particles from the fluid; a cellulose element for filtering moisture from the fluid; an outlet for allowing fluid out of the filter; and a bypass for fluid to bypass the cellulose element and at least one screen and exit the filter, wherein the bypass filter is configured to directly replace the pre-existing full flow filter.

12 Claims, 6 Drawing Sheets

(51) Int. Cl.
- *B01D 29/58* (2006.01)
- *B01D 15/00* (2006.01)
- *B01D 36/00* (2006.01)
- *F01M 11/03* (2006.01)
- *B01D 37/02* (2006.01)
- *B01D 27/14* (2006.01)
- *B01D 27/07* (2006.01)
- *B01D 35/30* (2006.01)
- *B01D 27/10* (2006.01)
- *F01M 1/10* (2006.01)

(52) U.S. Cl.
CPC .......... *B01D 27/146* (2013.01); *B01D 29/58* (2013.01); *B01D 35/306* (2013.01); *B01D 36/003* (2013.01); *B01D 37/025* (2013.01); *F01M 11/03* (2013.01); *F02M 37/22* (2013.01); *B01D 2201/208* (2013.01); *F01M 2001/1092* (2013.01); *F01M 2011/031* (2013.01)

(58) Field of Classification Search
CPC .. B01D 37/025; B01D 36/003; B01D 27/146; B01D 2201/208; F02M 37/22; F01M 11/03; F01M 2011/031; F01M 2001/1092
USPC ....... 210/335, 97, 105, 130, 167.01, 167.02, 210/254, 500.29
See application file for complete search history.

(56) References Cited

U.S. PATENT DOCUMENTS

| | | |
|---|---|---|
| 4,655,914 A | 4/1987 | Wada |
| 4,672,932 A | 6/1987 | Schmidt |
| 2006/0278570 A1 | 12/2006 | Meddock et al. |

* cited by examiner

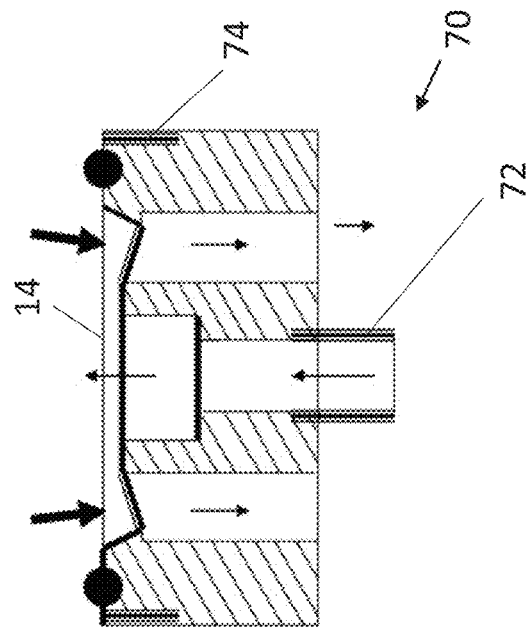
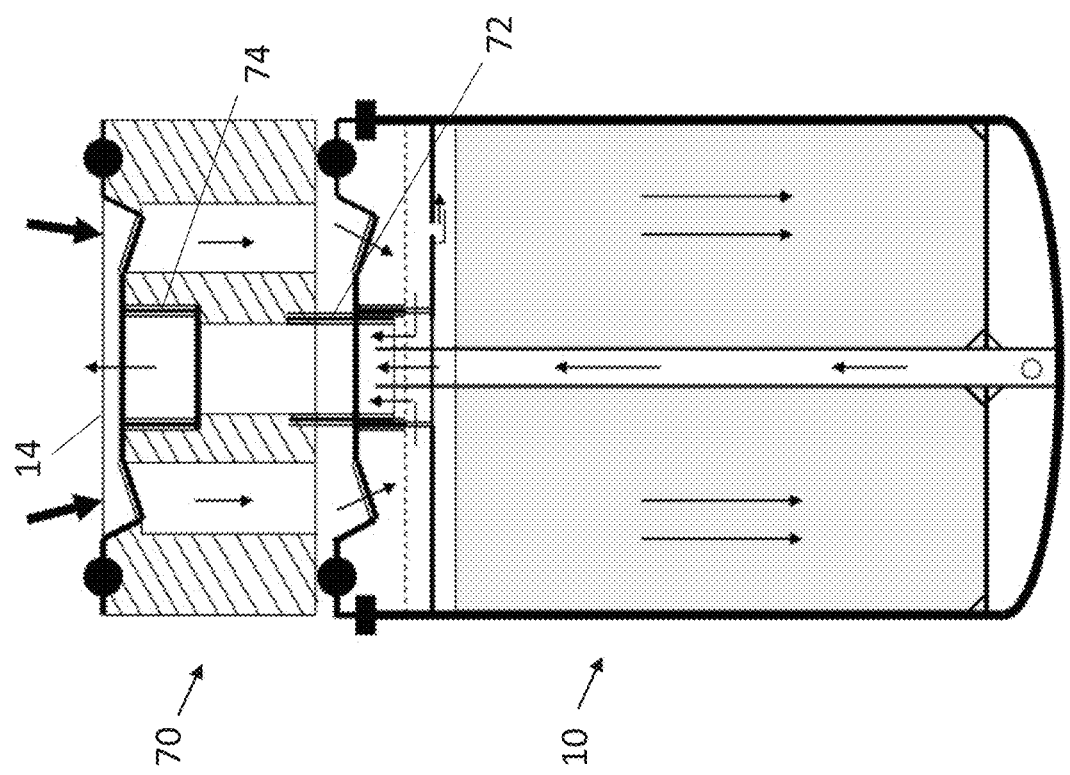

BYPASS FILTER METHOD AND DEVICE

CROSS-REFERENCE TO RELATED APPLICATIONS

This application is the United States national phase of International Application No. PCT/AU2015/000659 filed Nov. 4, 2015, and claims priority to Australian Patent Application No. 2014904432 filed Nov. 4, 2014, the disclosures of which are hereby incorporated in their entirety by reference.

FIELD OF THE INVENTION

The present invention relates to a bypass filter method and device.

BACKGROUND

It is known that common spin-on oil and fuel filters used on all diesel and petrol engines result in accumulated moisture and particulate contamination. This depletes the engine oil additive package, including Total Base Number (TBN), resulting in undesirable sludge, varnish and accelerated oil oxidation. Also, fuel economy and emission standards prematurely deteriorate as the Original Equipment Manufacturers (OEM) design function of the fuel injection systems and piston rings become impaired. Hence, the engine oil is 'spent' at only 250-500 hours in a diesel engine and 10,000 miles in a car petrol engine.

The primary issue with common spin-on oil filters is that they are full flow (70-185 litres per minute depending on the size of the engine) at approximately 80 psi. They only start filtering particulate at 30 to 40 μm and have no capacity to absorb or retain moisture. The technical issue with spin-on oil and fuel filters not retaining moisture in emulsion is that 'the presence of wear metals alone can cause oxidation rates to increase to five (5) times the normal rate, while the presence of water can increase the oxidation rate ten (10) times. Combined, water and metal catalysts can increase the oxidation rate fifty (50) times or more' (ref: *USA National Tribology*). From this, one learns that it is moisture contamination that accelerates oil oxidation ×10 and this critical issue was either not known, or was ignored in 1950's designed common spin-on oil and fuel filters that are still used today in all engines.

Another type of filtering device is known as edge-on or depth filtration, used in bypass kidney loop oil filtration. These are known to be most effective, but are mainly sold in the aftermarket, where there is consumer resistance to fitting hose connections and unwarranted concerns about engine warranty.

The present invention attempts to overcome at least in part some of the aforementioned disadvantages of previous filtering devices.

SUMMARY OF THE INVENTION

In accordance with one aspect of the present invention there is provided a method for converting a full flow oil and/or fuel filter system into a bypass filter system comprising the use of a retro-fittable bypass filter configured to directly replace the pre-existing full flow filter.

The fluid which is not bypassed, may be so filtered at a rate of between 0.5 and 2 litres per minute.

The fluid which is not bypassed, may be so filtered at a rate of 1.2 litres per minute The fluid which is not bypassed, may be so filtered at a pressure of between 0 and 10 psi.

The fluid which is not bypassed, may be so filtered at a pressure of between 4 and 6 psi.

In accordance with a second aspect of the present invention there is provided a retro-fittable bypass filter for converting a full flow oil and/or fuel filter system into a bypass filter system comprising:
an inlet for allowing fluid into the filter;
a plurality of screens for filtering particles from the fluid;
a cellulose element for filtering moisture from the fluid;
an outlet for allowing fluid out of the filter; and
a bypass for fluid to bypass the cellulose element and at least one screen and exit the filter,
wherein the filter is configured to directly replace a pre-existing full flow filter.

The cellulose element may comprise a satchel of moisture-absorbing polymer.

The filter may comprise a venturi effect between the outlet and the bypass.

The filter may further comprise a restriction orifice for restricting the volume of fluid to be filtered rather than bypassed.

The restriction orifice may have a diameter of between 1 and 20 mm.

The restriction orifice may have a diameter of 2 mm when the fluid is oil; and a diameter of 9 mm when the fluid is fuel.

The cellulose element may remove moisture from the fluid to a level of no more than 0.01 ppm.

The fluid may comprise oil additive package and the filter may release any oil additive package that has encapsulated particulate matter captured by the filter, back into the fluid.

At least one screen may comprise a woven mesh with apertures of a size slightly smaller than a diameter of the restriction orifice.

At least one screen may comprise a pad with apertures of a size between 5 and 10 μm.

At least one screen may be mounted on a screen support plate.

The filter may further comprise an adapter plate complementary to an apparatus requiring filtration, for adapting the filter to be directly fittable to an existing oil or fuel filter mounting.

BRIEF DESCRIPTION OF DRAWINGS

The present invention will now be described, by way of example, with reference to the accompanying drawings, in which:

FIG. 3 is a section view of the filter of FIG. 2 with an attached adapter plate;

FIG. 3a is a section view of a second embodiment of the adapter plate;

FIG. 5a is a detail view of a portion of the filter of FIG. 5; and

FIG. 5b is a detail view of another portion of the filter of FIG. 5.

DESCRIPTION OF PREFERRED EMBODIMENTS

Figure 1:
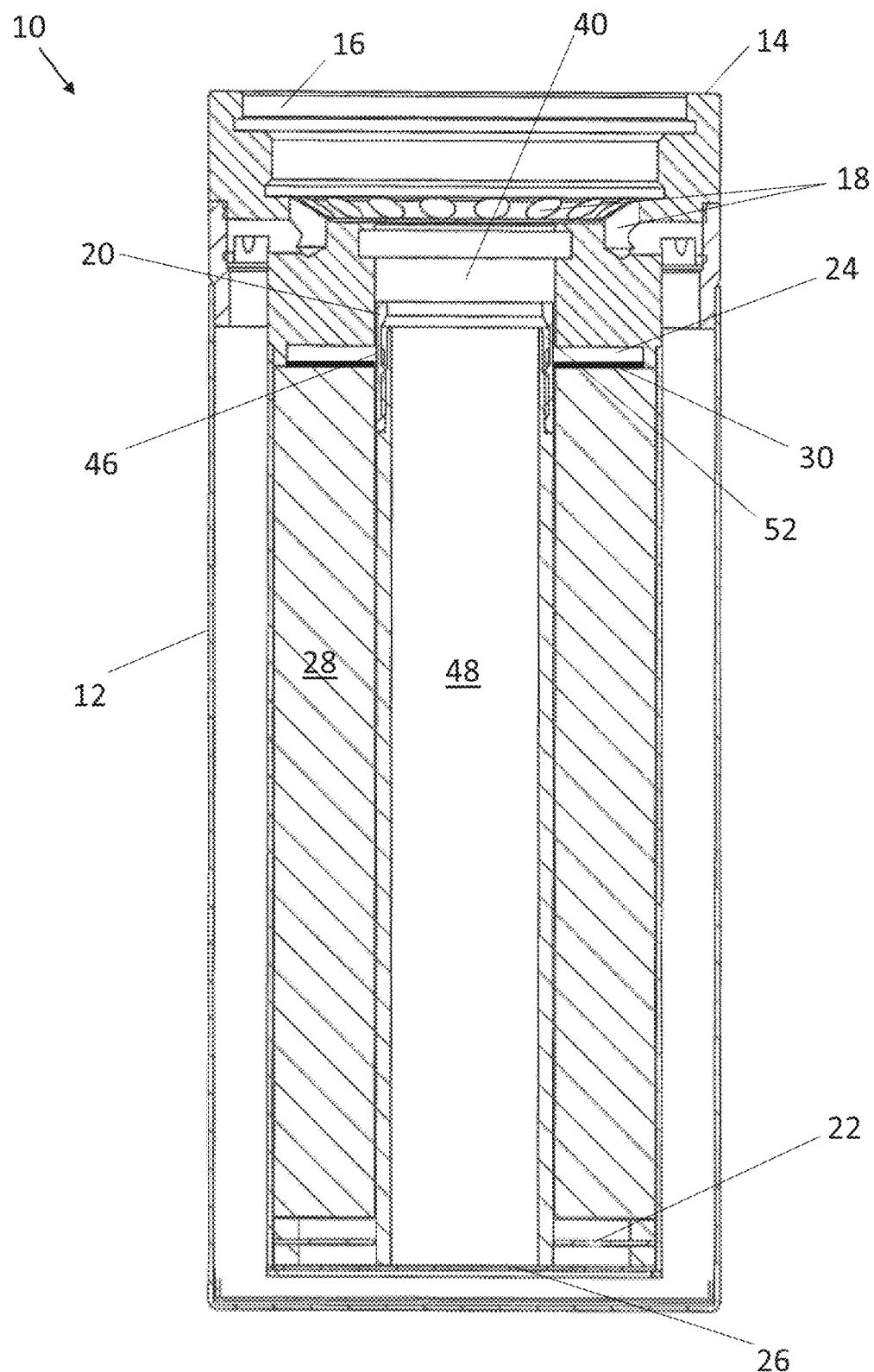
FIG. 1 is a front (top of FIG. 1) to back (bottom of FIG. 1) section view of a filter in accordance with one embodiment of the present invention.

Referring to the Figures, there is shown a retro-fittable bypass filter 10 for converting a full flow oil and/or fuel filter system into a bypass filter system according to a preferred embodiment of the present invention. The filter 10 comprises a body 12 which acts to encase the internal parts of the filter 10, which is substantially cylindrical in shape. With specific reference to FIG. 2, the body 12 of the filter 10 comprises a front face 14 forming a substantially circular cover for a majority of the front end of the filter 10. The front face 14 is shaped so as to enable it to receive an annular seal 16. It is preferred that the size, shape and configuration of the front face 14 and seal 16 is such that the filter 10 is complementary to connect to an oil and/or fuel reservoir on which it is used.

The front face 14 comprises an inlet port 18 which includes at least one aperture that allows entry of oil or fuel to the internal portion of the filter 10. The inlet port 18 opens to a filter screen 26, after which is disposed both a restriction orifice 22 and a relief channel 48. The restriction orifice 22 allows the flow of a controlled volume of fluid from the inlet port 18 to a cellulose filter element 28. The orifice 22 is preferably about 2 mm or 9 mm in diameter and, in use, allows the passage of between about 0.5 and 2 litres of fluid per minute, preferably about 1.2 litres of fluid per minute. It has been advantageously found that the pressure of the fluid allowed through the restriction orifice 22, and accordingly circulated through the filter 10 rather than being bypassed, is between about 0 and 10 psi, preferably between about 4 and 6 psi.

Disposed after the inlet port 18, prior to the restriction orifice 22 and relief channel 48, is at least one filter screen 26. The filter screen 26 preferably comprises a woven mesh pad comprising apertures of a size slightly smaller than the diameter of the restriction orifice 22. The filter screen 26, in use, removes large particles from the fluid being filtered and conglomerates particulate at the first side of the filter screen 26. In this way, the filter screen 26 removes any large particles that would otherwise have the opportunity to block the restriction orifice 22.

The cellulose filter element 28 is disposed such that oil or fuel passes through the element 28 from the restriction orifice 22. The cellulose filter element 28 may comprise a satchel of moisture-absorbing polymer, and filters particles, including substantially all moisture, from the oil or fuel which passes through it. The moisture filtered from the oil or fuel includes both heavy water and water in emulsion with the oil/fuel (sludge). Whilst removing contaminants from oil being filtered, it has been found that the present invention conserves the oil additive package, providing substantial benefits for the machinery on which it is used. It is preferred that the cellulose filter element 28 is in a coiled arrangement within the substantially cylindrical filter 10.

Figure 6:
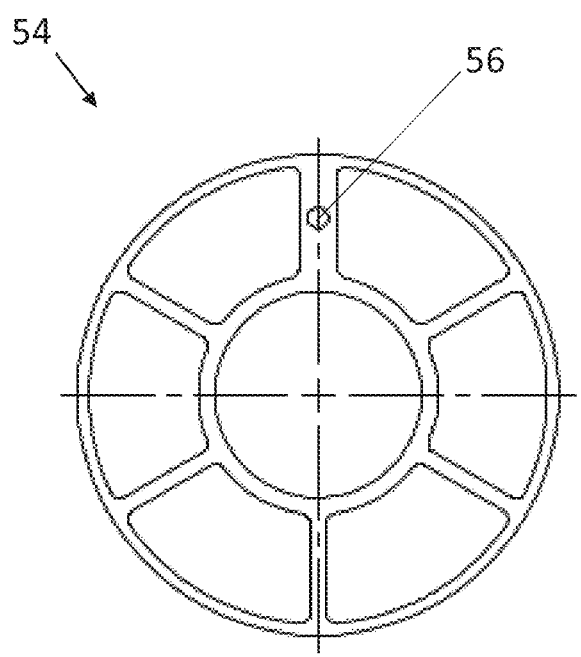
FIG. 6 is a plan view of a screen support plate of the filter of the present invention.

Disposed after the cellulose filter element 28, according to the direction of fluid through the filter 10, is a polishing screen 30 mounted on a screen support plate 54 (see FIG. 6), such that the cellulose filter element 28 is disposed between the filter screen 26 and polishing screen 30. The polishing screen 30 comprises a filter pad; preferably the filter pad of polishing screen 30 is substantially an absolute filter comprising apertures of a size between 5 and 10 μm. After the polishing screen 30 is a cavity 24. Within the cavity 24 is an end of a supply channel 20 which comprises a channel inlet 46. According to one embodiment of the present invention the supply channel 20 is formed as a channel substantially centrally within, and spanning the length of, the filter 10 (see FIG. 2).

Figure 5:
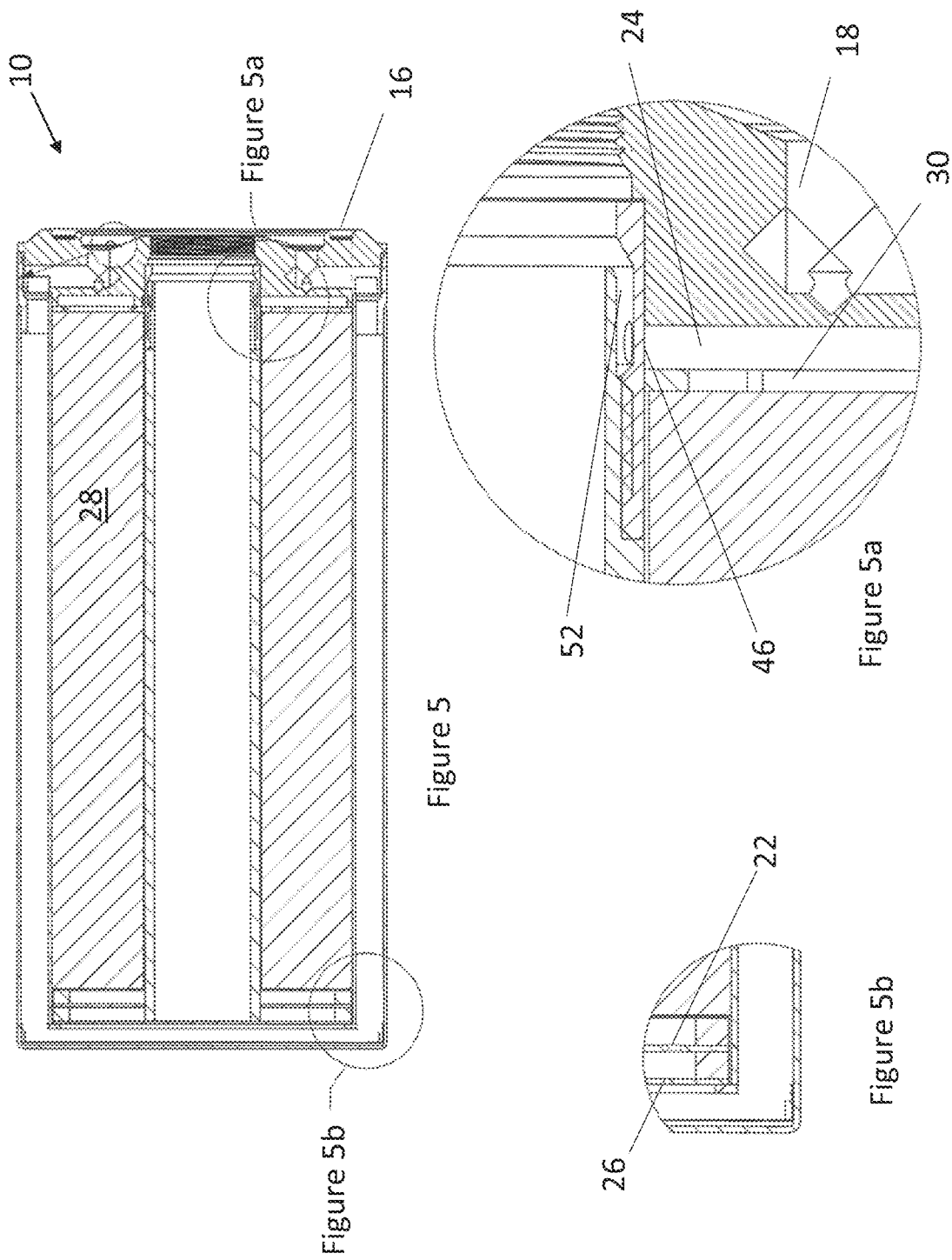
FIG. 5 is a section view of a filter in accordance with a fourth embodiment of the present invention.

With reference to FIGS. 1 and 5, alternative embodiments of the filter 10 of the present invention are shown, with like numbers referencing like parts to the second embodiment described above. As can be seen, all fluid enters the filter 10 at the inlet ports 18 to travel to the filter screen 26, disposed distally to the inlet ports 18. Again, the fluid passes through the filter screen 26 then to either the relief channel 48 or restriction orifice 22. Accordingly, the relief channel 48 is disposed as the channel substantially centrally within, and spanning the length of, the filter 10. As with previously described embodiments, fluid which is allowed through the restriction orifice 22 and is not bypassed, passes through the cellulose filter element 28, followed by the polishing screen 30 to the cavity 24. From the cavity 24, the filtered fluid enters the supply channel 20 through the channel inlet 46 and exits the filter 10 to be provided to the engine oil gallery, for example.

Figure 4:
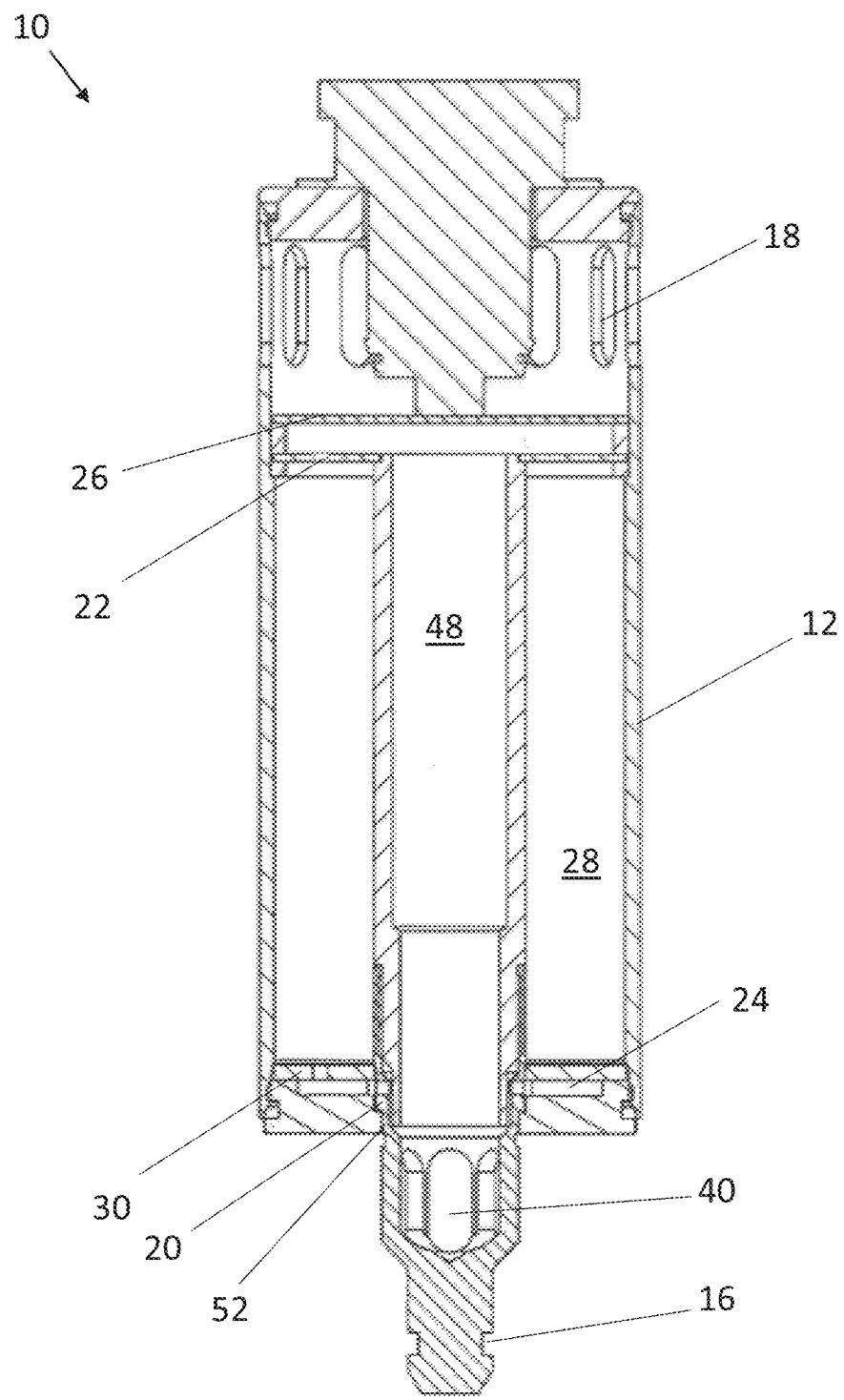
FIG. 4 is a section view of a filter in accordance with a third embodiment of the present invention

With reference to FIG. 4, a third embodiment of the filter 10 of the present invention is shown, with like numbers referencing like parts to the previously described embodiments. Again, fluid enters the filter through the inlet ports 18 and passes through the filter screen 26. The majority of fluid then enters the relief channel 48 and exits the filter 10 though the relief outlet 40 and is subsequently "bypassed". The minor volume of fluid allowed through the restriction orifice 22 is further filtered through firstly the cellulose filter element 28, then through the polishing screen 30. This "filtered" fluid then enters the supply channel 20 to exit the filter 10.

The relief channel 48 of the filter 10 provides a fluid connection between the inlet port 18 and a relief outlet 40 through which fluid which entered the inlet port 18 and relief channel 48 may return to the oil reservoir. It is preferred that the filter 10 comprises a venturi effect 52, between the supply channel 20 and the relief channel 48, as best seen in FIG. 5a. The relief outlet 40 may comprise a threaded portion on the internal wall thereof (see FIGS. 2, 3 and 5). As would be understood by the person skilled in the art, the threaded portion provides a connection by which the filter 10 may be threaded to and connect with the engine, for example, on which it is used. It is preferred that the relief outlet 40 and thread size is complementary to the part of the oil reservoir on which it is used.

With reference to FIGS. 3 and 3a, the filter 10 may be provided with an adapter plate 70 for ease of attachment of the filter 10 to the engine etc. on which it is used. Accordingly, the adapter plate 70 comprises a front face 14 configured to be complimentary to the equipment to which it is retro-fitted. Hence, it has been found that a standard filter 10 may be provided with one of any number of adapter plates 70 such that the filter 10 may be used for various different engines etc.

The adapter plate 70 comprises a filter thread 72 complimentary to the threaded portion on the relief outlet 40 of the filter 10, thereby provided a connection between the filter 10 and the adapter plate 70. The adapter plate 70 further comprises an adapter thread 74 suited to its connection point on the engine. The adapter thread 74 may be provided as either an internal thread as shown on FIG. 3 or an external thread as shown on FIG. 3a, according the configuration of the equipment requiring filtration.

Figure 2:
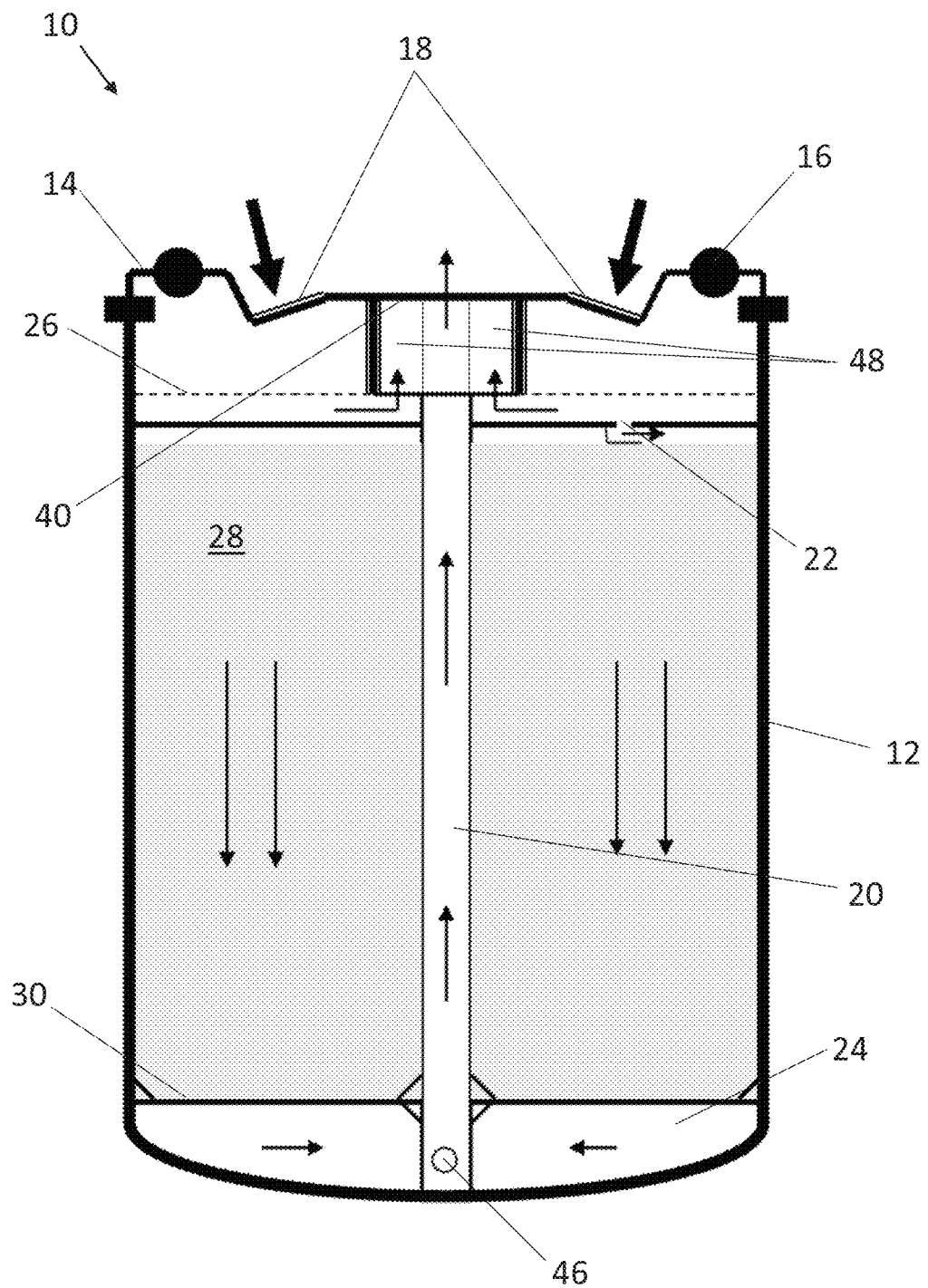
FIG. 2 is a section view of a filter in accordance with a second embodiment of the present invention.

The axial flow of fluid through both pathways provided by the fuel filter 10 is represented with arrows on FIGS. 2, 3 and 3a. The restriction orifice 22 only allows the passage of a portion of fluid, so the remainder enters the relief channel 48 and returns to the engine through the relief outlet 40. As would be understood, this ensures, for example, that the engine is not starved of oil while it passes through the filter 10.

The filter 10 may be constructed of any suitable material including metal or plastic by cutting or injection moulding, for example. It is also possible for the filter to be constructed of a composition of different materials, for example with the exterior constructed of plastic and the interior of metal.

In use, the filter 10 may be threaded onto, or otherwise provided to, an engine or other part of a machine on which it is to be used either directly or indirectly, through the use of the adapter plate 70. Preferably, the threaded portion of the relief outlet 40 is rotated onto a complementarily threaded portion of the engine. As would be understood, it is preferred that the size, shape and configuration of the filter 10 and threaded portion of the relief outlet 40 is complementary to the engine and thread on which it is used.

Once fitted, the inlet port 18 can receive oil or fuel from the oil or fuel reservoir of the machinery on which it is used, or other source, as desired. Fluid is received through the inlet port 18, past the front face 14 to the internal part of the filter 10, specifically through the filter screen 26 to the restriction orifice 22 or relief channel 48. As would be understood, only a controlled volume of fluid is permitted through the restriction orifice 22.

The fluid to the restriction orifice 22 has been forced, under the pressure in the filter system, through the filter screen 26. As the filter screen 26 comprises mesh with apertures of a size no larger than 1.8 mm when the restriction orifice 22 is 2 mm, or no larger than 8.8 mm when the restriction orifice is 9 mm, particles larger than this size are separated from the fluid, which is allowed through the restriction orifice 22 into the cellulose filter element 28. The cellulose filter element 28 allows the passage of oil or fuel but not moisture. Accordingly the cellulose filter element 28 removes substantially all moisture from the fluid being filtered.

Upon exiting the cellulose filter element 28, the fluid is forced through the polishing screen 30. In a similar fashion to the fluid passing the filter screens 26, as the polishing screen 30 comprises a pad with apertures of a size between 5 and 10 µm, particles larger than this size are separated from the fluid, said fluid passing through the polishing screen 30 to the cavity 24. To ensure no blockages from build-up of particulate matter on the polishing screen 30, at least one orifice 56 of a size about 2 mm or 9 mm is provided in the screen support plate 54. Once filtered, the fluid from the cavity 24 enters the supply tube 20 through the tube inlet 46. The fluid then travels the length of the supply tube 20 to exit the filter 10 and can be provided to the engine oil gallery.

The remaining volume, being the bulk of oil/fuel entering though the inlet 18, is not allowed passage to the restriction orifice 22. Rather, the fluid travels through the filter screen 26, via the relief channel 48 to exit the filter through the relief outlet 40. Accordingly, the fluid not allowed though the restriction orifice 22 exits the filter 10 through the relief outlet 40 to be used by the engine or other part of the machinery as required. As would be understood, according to the equipment and the volume of the fluid reservoir on which the filter 10 is used, between about 70 and 185 litres per minute of fluid is bypassed. This bypass fluid travels through the filter screen 26, for capture of large particles, then out of the filter 10 via the relief channel 48 through the relief outlet 40.

It has been found that the present invention provides advantages over existing filtration methods and devices including: operation of the entire diesel engine inventory on 1,000-3,000 hour extended oil and filter element change; significant reduction in the cost of repairs and maintenance on engines and hydraulic pumps; reduction in the cost of oil, filters and labour to service diesel engines by 70%; assured optimum engine performance, availability and extended lubricated component service life; significant reduction in cost and volume of waste oil disposal, and carbon foot print with a direct correlation between improved fuel economy and improved standard of emissions; maintenance of performance and significantly extended service of fuel pumps and injectors; achievement of engine and hydraulic 'Least Whole of Life Cost'.

Optimum filtration standard is achieved through this invention; the contaminants of particulate and water in emulsion are captured so the oil additive package including Total Base Number (TBN) is conserved. The relatively low flow rate and pressure allows the oil additive package to be released from around the particulate so additive package stripping is significantly reduced. This has been found to reduce pressure on oil additive package detergency and dispercency, to maintain the full OEM design function of the piston rings and injection system. Optimum engine performance, availability, significantly extended engine life, optimum fuel economy results as does a reduction in engine service operating expense including labour by 70%.

As it is known that bypass kidney loop oil filtration can enable engines with low operating hours to operate on 2,000-3,000 extended hours oil change, this invention achieves this same extended hours in the same spin-on filter dimensions as the OEMs use.

Other embodiment filters 10 are contemplated in accordance with the preferred embodiments of the present invention. For example, while it is preferred that the filter 10 is used to filter oil or diesel or other fuel for a motor, filtration of other fluids and use on other engines or equipment for filtration purposes are able to be performed with the filter 10 of the present invention. The oil and/or fuel reservoirs on which the filter 10 may be used include, but are not limited to, engines, oil sumps, dry sump systems, hydraulics and gear boxes.

Modifications and variations as would be apparent to a skilled addressee are deemed to be within the scope of the present invention.

The invention claimed is:

1. A bypass filter for filtering oil and/or fuel comprising:
   a body to encase internal parts of the bypass filter, the body having an inlet for allowing fluid into the filter;
   the internal parts of the bypass filter including
   at least one screen for filtering particles from the fluid,
   a cellulose element for filtering moisture from the fluid, and
   a relief channel for fluid to bypass the cellulose element and exit the filter;
   the body further having an outlet for allowing fluid out of the bypass filter;
   wherein the bypass filter further comprises a restriction orifice as an internal part, the restriction orifice being positioned between the at least one screen and the cellulose element, the restriction orifice only allowing the passage of a portion of the fluid that has passed through the at least one screen to the cellulose element, thereby restricting the volume of fluid to be filtered, with the remainder of the fluid entering the relief channel; and wherein the at least one screen is disposed between the inlet and the restriction orifice, for filtering particles from the fluid entering the relief channel and the restriction orifice.

2. The filter according to claim 1, wherein the cellulose element comprises a satchel of moisture-absorbing polymer.

3. The filter according to claim 1, wherein the filter comprises a venturi effect between the cellulose element and the outlet.

4. The filter according to claim 1, wherein the restriction orifice has a diameter of between 1 and 20 mm.

5. The filter according to claim 4, wherein the restriction orifice has a diameter of 2 mm when the fluid is oil; or a diameter of 9 mm when the fluid is fuel.

6. The filter according to claim 1, wherein the cellulose element removes moisture from the fluid to a level of no more than 0.01 ppm.

7. The filter according to claim 1, wherein the fluid comprises oil additive package and the filter releases any oil additive package that has encapsulated particulate matter captured by the filter, back into the fluid.

8. The filter according to claim 1, wherein the at least one screen comprises a woven mesh with apertures of a size slightly smaller than a diameter of the restriction orifice.

9. The filter according to claim 1, wherein the at least one screen comprises a pad with apertures of a size between 5 and 10 µm.

10. The filter according to claim 1, wherein the at least one screen is mounted on a screen support plate.

11. The filter according to claim 1, further comprising an adapter plate complementary to an apparatus requiring filtration, for adapting the filter to be directly fittable to an existing oil or fuel filter mounting.

12. The filter according to claim 1, wherein the bypass filter comprises only a single restriction orifice.

* * * * *